United States Patent [19]

Murai

[11] Patent Number: 5,657,697
[45] Date of Patent: Aug. 19, 1997

[54] COILS FOR MAGNETIC LEVITATION APPARATUS

[75] Inventor: Toshiaki Murai, Kokubunji, Japan

[73] Assignee: Railway Technical Research Institute, Japan

[21] Appl. No.: 595,582

[22] Filed: Feb. 1, 1996

[30] Foreign Application Priority Data

Feb. 6, 1995 [JP] Japan ................................ 7-018190

[51] Int. Cl.⁶ .................................................... B60L 13/06
[52] U.S. Cl. .......................... 104/284; 104/281; 104/286
[58] Field of Search ..................................... 104/281, 282, 104/284, 286

[56] References Cited

U.S. PATENT DOCUMENTS

| | | | |
|---|---|---|---|
| 4,690,066 | 9/1987 | Morishita et al. | 104/282 |
| 4,913,059 | 4/1990 | Fujie et al. | 104/282 |
| 5,275,112 | 1/1994 | Rote et al. | 104/282 |
| 5,388,527 | 2/1995 | Thornton | 104/284 |
| 5,517,924 | 5/1996 | He et al. | 104/286 |

OTHER PUBLICATIONS

LDIA '95, Nagasaki pp. 37–40, Murai et al.

*Primary Examiner*—S. Joseph Morano
*Attorney, Agent, or Firm*—Lorusso & Loud

[57] ABSTRACT

Disclosed is a coil of a magnetic levitation apparatus for supporting a moving body without contact by utilizing electromagnetic force produced by electromagnetic induction. Upper and lower stages of a two-stage induction coil arranged vertically with respect to the direction of travel of the moving body are connected so as to have mutually opposing orientations and are arranged in an asymmetrical figure-eight structure in which the heights or the numbers of turns of the upper and lower stages of the induction coil differ from each other. A guidance force large enough to offset lateral displacement of the moving body is produced, generation of a moment in the rolling direction of the moving body is reduced and non-contact support of the moving body in a region of lower velocities is made possible.

9 Claims, 4 Drawing Sheets

COILS FOR MAGNETIC LEVITATION APPARATUS

BACKGROUND OF THE INVENTION

This invention relates to coils for a magnetic levitation apparatus which supports a moving body without contact by utilizing an electromagnetic force produced by electromagnetic induction. More particularly, the invention relates to induction coils in a magnetic levitation apparatus capable of supporting a moving body without contact even if the traveling velocity of the moving body is low.

A magnetic levitation apparatus for supporting a moving body contactlessly by utilizing electromagnetic force produced by electromagnetic induction finds use in electromagnetically levitated railways and electromagnetically levitated conveyance systems. An electromagnetically levitated railway will be discussed as one example of use of an electromagnetic levitation apparatus.

First, reference directions and directions of force will be clarified. The direction in which a moving body travels shall be referred to as the direction of travel. Among the directions lying at right angles to the direction of travel, the direction along which the force of gravity acts shall be referred to as the vertical direction, and directions other than the vertical direction shall be referred to collectively as the lateral direction. The direction of rotation about the traveling direction shall be referred to as the rolling direction. Further, with regard to coil dimensions, the dimension in the vertical direction shall be referred to as coil height and the dimension in the direction of travel shall be referred to as coil length.

In a magnetically levitated railway, a truck serving as a moving body is provided with superconducting coils functioning as magnetic-field generating sources (the coils shall be referred to as a "field generating coils" below), and the side walls of the guideway are provided with short-circuit coils (referred to as "induction coils" below) for generating induced current. If a relative velocity develops between the field generating coils and the induction coils, an induced current will flow through the induction coils in accordance with Lenz's law. Electromagnetic force is generated between the induced current and the field generating coils, thereby making it possible to support the moving body without contacting it.

The advantages of supporting a moving body contactlessly by means of electromagnetic force may be summarized as follows:

(1) High speed is possible.

(2) Load acts upon the guideway while being dispersed. This makes it possible to design the railway less stringently in terms of required strength.

(3) Since there are no points of frictional contact between the moving body and the guideway, the moving body and the guideway are easier to maintain.

(4) The system is environmentally friendly since there is no noise or vibration that ordinarily accompanies contact.

However, the electromagnetic force for supporting the moving body without contact starts to be produced only after relative velocity develops between the field generating coils and the induction coils. The electromagnetic force is not very large when the relative velocity is low.

Further, in order to support the moving body without contact, an electromagnetic force for supporting the weight of the moving body is necessary and an electromagnetic stiffness is required to restore the moving body to a normal position by overcoming external disturbances in the bilateral direction.

This means that it is necessary for the moving body to run on auxiliary wheels in a region of velocities within which the electromagnetic force or electromagnetic stiffness necessary for supporting the moving body without contact is not attained.

When the moving body runs on its auxiliary wheels, it is required that the guideway has tracks for the auxiliary wheels. As a result, this track must be stringently designed for sufficient strength owing to the concentration of load. In addition, since there are points of friction between the auxiliary wheels and the tracks, maintaining the auxiliary wheels and the tracks is not easy.

Accordingly, there is demand for a magnetic levitation apparatus capable of supporting a moving body contactlessly starting from as low a velocity as possible.

The foregoing holds true also with regard to a magnetically levitated conveyance system, in which the only change is that the moving body is a conveyed body rather than a truck.

Reference will now be had to the drawings to describe a magnetically levitated railway as one example of use of a magnetic levitation apparatus according to the prior art.

Figure 1:
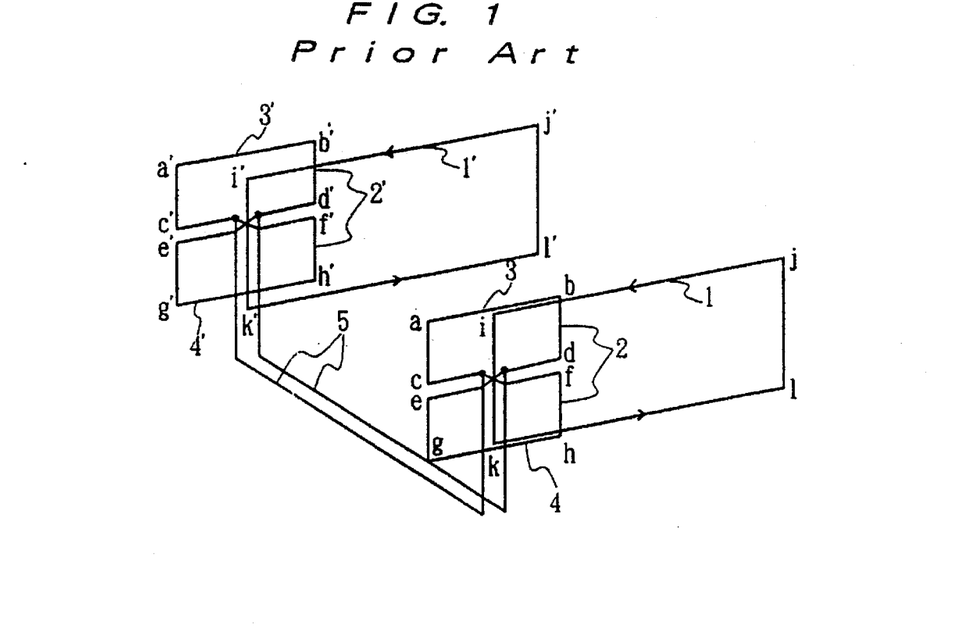
FIG. 1 is an explanatory view illustrating the manner in which field generating coils and induction coils are connected in a conventional magnetic levitation apparatus.
Figure 2:
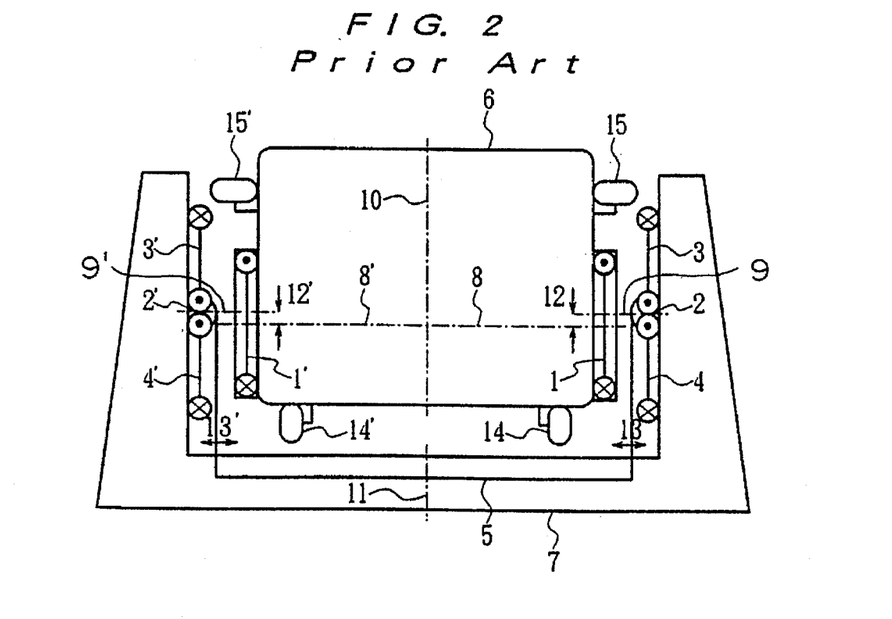
FIG. 2 is an explanatory view of a magnetic levitation apparatus in the prior art.

FIG. 1 is an explanatory view illustrating the manner in which field generating coils and induction coils are connected in a conventional magnetic levitation apparatus, and FIG. 2 is an explanatory view of a magnetic levitation apparatus in the prior art.

Shown in FIGS. 1 and 2 are field generating coils 1, 1', induction coils 2, 2', upper coils 3, 3' of the induction coils 2, 2', lower coils 4, 4' of the induction coils 2, 2', null-flux wires 5, a moving body (truck) 6, a guideway 7, vertical centers 8, 8' of the field generating coils 1, 1', vertical centers 9, 9' of the induction coils 2, 2', a lateral center 10 of the moving body 6, a lateral center 11 of the guideway 7, distances 12, 12' between the vertical centers of the field generating coils 1, 1' and the vertical centers of the induction coils 2, 2', lateral spacings 13, 13' between the field generating coils 1, 1' and the induction coils 2, 2', support wheels 14, 14', and guidance wheels 15, 15'. Further, a, a', b, b', c, c' and d, d' represent the vertices of the upper coils 3, 3' of the induction coils 2, 2', e, e', f, f', g, g' and h, h' represent the vertices of the lower coils 4, 4' of the induction coils 2, 2', and i, i', j, j', k, k' and l, l' represent the vertices of the field generating coils 1, 1'.

The field generating coils 1, 1' are secured to respective ones of both sides of the moving body (truck) 6. The induction coils 2, 2' through which an induced current flows are secured to the side walls of the U-shaped guideway 7 so as to face the field generating coils 1, 1', respectively, and are disposed continuously in the direction of travel across the entirety of the guideway. The moving body 6 has the support wheels 14, 14', which are for supporting the moving body 6 in the low-velocity region, and the guidance wheels 15, 15'.

The induction coils 2, 2' comprise the upper coils 3, 3' of the induction coils and the lower coils 4, 4' of the induction coils, these coils having the same dimensions and numbers of turns and being arranged in two stages, one above the other. The upper coils 3, 3' of the induction coils and the lower coils 4, 4' of the induction coils are connected so as to be oppositely oriented from each other with respect to the magnetic fields produced by the field generating coils 1, 1'. Further, the upper coils 3, 3' of the induction coils and the lower coils 4, 4' of the induction coils are connected, on the left and right sides of the U-shaped guideway 7, by the null-flux wires 5 so to be oppositely oriented with respect to the magnetic fields produced by the field generating coils 1, 1'.

In a case where the vertical centers 8, 8' of the field generating coils and the vertical centers 9, 9' of the induction coils coincide, the magnetic fields interlinking the upper and lower coils of the induction coils 2, 2' from the field generating coils 1, 1' become zero, no induced current flows and no levitation force is produced.

When the field generating coils 1, 1' descend under the weight of the moving body 6 so that the vertical centers 8, 8' of the field generating coils assume positions slightly below the vertical centers 9, 9' of the induction coils, interlinking magnetic fields develop between the upper and lower coils of the induction coils 2, 2'. As a result, induced current flows and a levitation force is produced. Consequently, the moving body 6 is supported contactlessly at a vertical position at which the weight of the moving body and the levitation force balance. A feature of the levitation force is that the levitation force increases as the distances 12, 12' between the vertical centers 8, 8' of the field generating coils and the vertical centers 9, 9' of the induction coils increase and as the lateral spacings 13, 13' between the field generating coils and the induction coils decrease.

Further, in a case where the lateral center 10 of the moving body and the lateral center 11 of the U-shaped guideway 7 coincide so that the lateral spacings 13, 13' between the field generating coils and the induction coils become equal at each of the left and right coils, the magnetic fields interlinking the left and right coils of the induction coils 2, 2' from the field generating coils 1, 1' become zero, no induced current flows and no force (referred to as a guidance force below) that attempts to move the moving body 6 in the lateral direction is produced. In a case where the vehicle body 6 is displaced in the lateral direction by cross wind or by centrifugal force that is produced when the moving body travels along a curved section of the railway, as a result of which the lateral spacings 13, 13' between the field generating coils and the induction coils differ at each of the left and right coils, interlinking magnetic fields develop between the left and right coils of the induction coils 2, 2'. As a result, induced current flows and a guidance force that attempts to restore the moving body 6 to its original position is produced.

If the moving body 6 is displaced laterally (here a case in which the moving body 6 is displaced in the direction of the induction coil 2 will be taken as an example), the induction coil 2 on the side on which the literal spacing 13 between the field generating coils and the induction coils has narrowed produces a levitation force greater than that produced by the induction coil 2' on the side on which the lateral spacing 13' between the field generating coils and the induction coils has widened. As a result, a counter-clockwise moment is produced in the rolling direction.

The following equivalent guidance stiffness F y y' is used as a guidance stiffness in a case where a large moment is produced in the rolling direction at the time of lateral displacement:

$$F\ y\ y'=F\ y\ y-M\phi y \times F\ y\phi / M\phi\phi$$

where F y y represents guidance stiffness [(guidance force) (lateral displacement) at time of lateral displacement]; M$\phi$ y, F y$\phi$ the coupling stiffness between guidance and rolling [(rolling moment)/(lateral displacement) at the time of lateral displacement, (guidance force)/(rolling angle) at the time of rolling displacement, these two constants generally agreeing with each other]; and M$\phi\phi$ the rolling stiffness [(rolling moment)/(rolling angle) at time of rolling displacement].

According to the above equation, the equivalent guidance stiffness decreases when the coupling stiffness between guidance and rolling increases. Therefore, the equivalent guidance stiffness in this method becomes small.

When the manner in which each side of the induction coils 2, 2' produces electromagnetic force is investigated, it is seen that levitation force is produced mainly by the central sides cd, c'd', ef, e'f' and that guidance force is produced by the lowermost sides gh, g'h'.

On the other hand, the uppermost sides ab, a'b' do not produce guidance force very much. Since levitation force is produced by the means that the vertical centers 8, 8' of the field generating coils fall below the vertical centers 9, 9' of the induction coils, as the result, the distance between the uppermost sides ab, a'b' and the upper sides ij, i'j' of the field generating coils 1, 1' becomes larger than the distance between the lowermost sides gh, g'h' and the lower saides kl, k'l' of the field generating coils 1, 1'. For this reason, not much guidance force is produced.

Thus, the equivalent guidance stiffness in the conventional method is inadequate in the low-velocity region. In the case of a magnetically levitated railway, it is believed that the velocity at which contactless support starts is on the order of 150 km/h.

The foregoing holds true also with regard to a magnetically levitated conveyance system, in which the only change is that the moving body is a conveyed body rather than a truck.

Thus, in accordance with the prior art, an electromagnetic force for supporting a moving body without contact is not obtained at low relative velocity and neither is electromagnetic stiffness for restoring the moving body to the normal position when the moving body is displaced by external distrubance in the lateral direction.

SUMMARY OF THE INVENTION

The present invention has been devised in order to solve the foregoing problems and an object thereof is to provide a coil for a magnetic levitation apparatus for generating a larger guidance force to overcome lateral displacement and for making it possible to support a moving body contactlessly in a region of lower velocities by reducing the generation of moment in the rolling direction.

According to the present invention, the foregoing object is attained by providing a vertically asymmetrical figure-eight induction coil of a magnetic levitation apparatus, characterized in that the coil is constructed by connecting, so as to have mutually opposing orientations, upper and lower stages of an induction coil disposed one above the other vertically with respect to direction of travel of a moving body, and arranging it so that height of the upper stage of the induction coil and height of the lower stage of the induction coil differ from each other, thereby the generation of moment in the rolling direction being reduced.

Further, a vertically asymmetrical figure-eight induction coil of a magnetic levitation apparatus according to the invention is constructed by connecting, so as to have mutually opposing orientations, upper and lower stages of an induction coil disposed one above the other vertically with respect to direction of travel of a moving body, and arranging it so that number of turns of the upper stage of the induction coil and number of turns of the lower stage of the induction coil differ from each other.

Furthermore, a vertically asymmetrical figure-eight induction coil of a magnetic levitation apparatus according to the invention is constructed by connecting, so as to have mutually opposing orientations, upper and lower stages of an induction coil disposed one above the other vertically with respect to direction of travel of a moving body, and arranging it so that height and number of turns of the upper stage of the induction coil and height and number of turns of the lower stage of the induction coil differ from each other.

Further, a vertically asymmetrical figure-eight induction coil of a magnetic levitation apparatus according to the invention is characterized by being used as a ground coil of a magnetically levitated railway disposed on a guideway.

Furthermore, a vertically asymmetrical figure-eight induction coil of a magnetic levitation apparatus according to the invention is characterized by being used as a fixed coil of a magnetically levitated conveyance system disposed on a conveyance line.

Furthermore, though the induction coil basically has the shape of a figure-eight, the upper and lower coils are not limited to a circular or rectangular shape but may be of any shape that makes it possible to produce interlinking magnetic fields from field generating coils.

In accordance with the present invention, upper and lower stages of an induction coil are connected so as to have mutually opposing orientations, and the upper and lower stages are made to differ from each other in terms of height or number of turns or both. As a result, the following actions and effects are obtained:

(1) When a levitation force for supporting the weight of the moving body is generated, the distance between the upper side of the field generating coil and the uppermost side of the figure-eight coil can be made to be the same as the distance between the lower side of the field generating coil and the lowermost side of the figure-eight coil.

(2) As a consequence, a large guidance force can be produced in the both the uppermost and lowermost sides to overcome lateral displacement of the moving body.

(3) The generation of moment in the rolling direction at the time of lateral displacement can be reduced by utilizing the induced current that flows between the left and right coils owing to lateral displacement.

Thus, the equivalent guidance stiffness can be increased and the velocity at which contactless support begins can be lowered.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Reference will now be had to the drawings to describe a magnetically levitated railway as one example of use of a magnetic levitation apparatus according to the present invention. The invention will be described initially with regard to a first embodiment.

Figure 3:
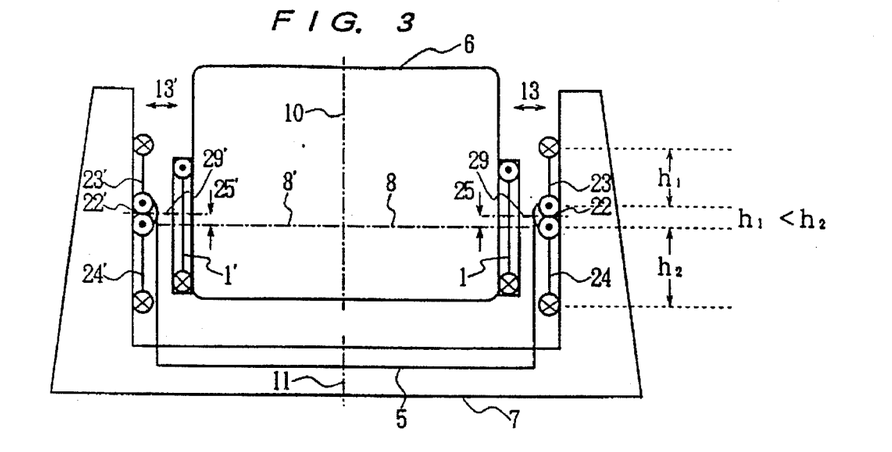
FIG. 3 is an explanatory view illustrative of a first embodiment of the present invention for a case where the height of the lower coil segment of an induction coil is greater than the height of an upper coil segment of the induction coil composed of upper and lower coils segments in a magnetic levitation apparatus.
Figure 4:
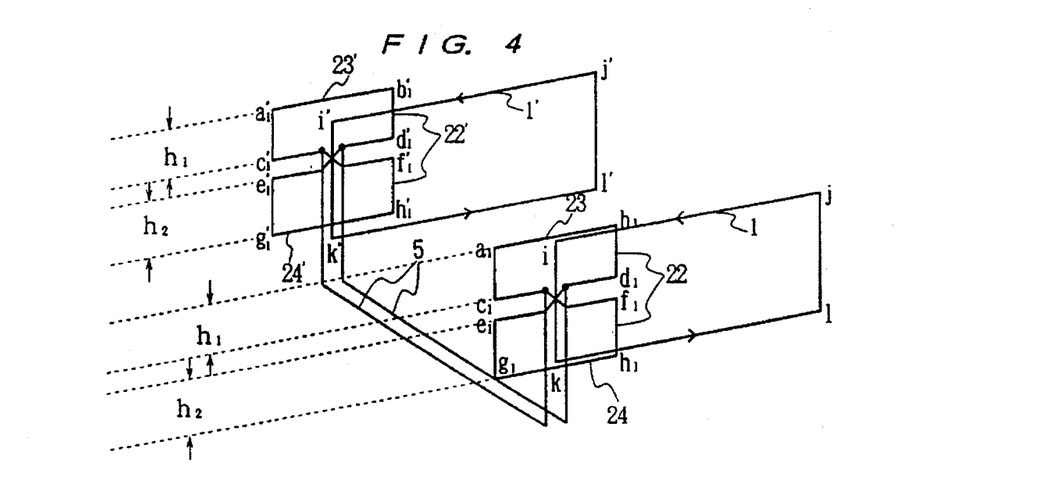
FIG. 4 is an explanatory view illustrating the manner in which field generating coils and induction coils are connected in a magnetic levitation apparatus according to the first embodiment of the present invention.

Shown in FIGS. 3 and 4 are field generating coils 1, 1', induction coils 22, 22', upper coils 23, 23' of the induction coils, lower coils 24, 24' of the induction coils, null-flux wires 5, a moving body (truck) 6, a guideway 7, vertical centers 8, 8' of the field generating coils, vertical centers 29, 29' of the induction coils, a lateral center 10 of the moving body, a lateral center 11 of the guideway 7, distances 25, 25' between the vertical centers of the field generating coils and the vertical centers of the induction coils, and lateral spacings 13, 13' between the field generating coils and induction coils. Further, $a_1, a_1', b_1, b_1', c_1, c_1'$, and $d_1, d_1'$ represent the vertices of the upper coils 23, 23' of induction coils, $e_1, e_1', f_1, f_1', g_1, g_1'$ and $h_1, h_1'$ represent the vertices of the lower coils of induction coils 24, 24', and i, i', j, j', k, k' and l, l' represent the vertices of the field generating coils 1, 1'.

In this embodiment, the heights of the upper and lower stages of the induction coil of the magnetically levitated railway are designed to be different from each other. More specifically, if $h_1$, represents the height of the upper stage of the induction coil and $h_2$ the height of the lower stage, then the heights are related by $h_1 < h_2$.

The induction coils 22, 22' are connected in such a manner that the upper coils 23, 23' of the induction coils of small height and the lower coils 24, 24' of the induction coils of large height become oppositely oriented with respect to the field generating coils 1, 1'. Further, the upper coils 23, 23' of the induction coils and the lower coils 24, 24' of the induction coils are connected, on the left and right sides of the guideway 7, by the null-flux wires 5 so as to be oppositely oriented with respect to the magnetic fields produced by the field generating coils 1, 1'.

Since the impedance of the upper coils 23, 23' of the induction coils and the lower coils 24, 24' of the induction coils is proportional to the perimeter of the coil, it is the upper coils 23, 23' of the induction coils of small height that are small.

It should be noted that the vertical centers 29, 29' of the induction coils serve as the boundaries between the upper coils 23, 23' of the induction coils and the lower coils 24, 24' of the induction coils.

By adopting this construction for the coils, the distances between the uppermost sides $a_1b_1$, $a_1'b_1'$ of the induction coils 22, 22' and the upper sides ij, i'j' of the field generating coils 1, 1' do not increase even if the vertical centers 8, 8' of the field generating coils descend below the vertical centers 29, 29' of the induction coils to produce a levitation force. As a result, a large guidance force is produced and the guidance stiffness can be enlarged.

If the moving body (truck) 6 is displaced laterally (here a case in which the moving body 6 is displaced in the direction of the induction coil 22 will be taken as an example), an induced current which attempts to restore the moving body 6 to its original position flows between the left and right coils. In the shunting of the induced current between the upper and lower coils, much of the current is shunted into the upper coils 23, 23' of the induction coils of small impedance. Consequently, as a result of this current, the induction coil 22 on the side of narrower lateral spacing 13 between the field generating coil and the induction coil produces a downward repulsive force, and the induction coil 22' on the side of wider lateral spacing 13' between the field generating coil and the induction coil produces an upward attractive force, thereby producing a clockwise moment in the rolling direction. As a result, this arrangement acts to cancel the above-mentioned counter-clockwise moment in the rolling direction so that the coupling stiffness between guidance and rolling can be reduced.

A second embodiment of the present invention will now be described.

Figure 5:
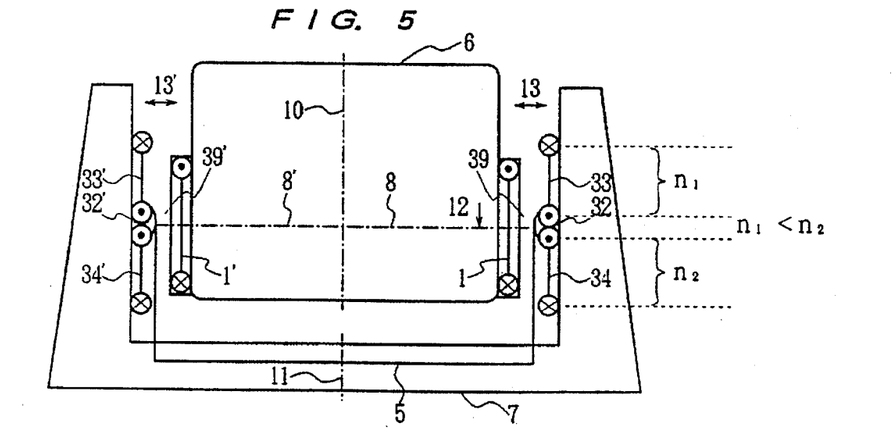
FIG. 5 is an explanatory view illustrative of a second embodiment of the present invention for a case where the number of turns of the lower coil segment of an induction coil is greater than the number of turns of an upper coil segment of the induction coil composed of upper and lower coils segments in a magnetic levitation apparatus.
Figure 6:
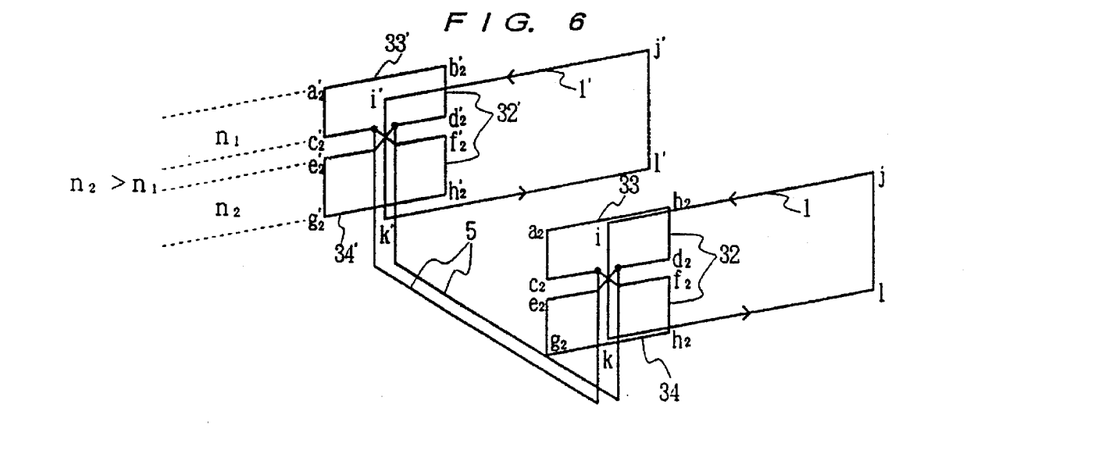
FIG. 6 is an explanatory view illustrating the manner in which field generating coils and induction coils are connected in a magnetic levitation apparatus according to the second embodiment of the present invention.

As shown in FIGS. 5 and 6, in this embodiment the numbers of turns of the upper and lower stages of the induction coil of the magnetically levitated railway are designed to be different from each other. More specifically, if $n_1$ represents the number of turns of the upper stage of the induction coil and $n_2$ the number of turns of the lower stage, then the numbers of turns are related by $n_1 < n_2$.

Induction coils 32, 32' are connected in such a manner that upper coils 33, 33' of the induction coils of small number of turns and lower coils 34, 34' of the induction coils of large number of turns become oppositely oriented with respect to the field generating coils 1, 1'. Further, the upper coils 33, 33' of the induction coils and the lower coils 34, 34' Of the induction coils are connected, on the left and right sides of the guideway 7, by the null-flux wires 5 so as to be oppositely oriented with respect to the magnetic fields produced by the field generating coils 1, 1'.

The impedance of the upper coils 33, 33' of the induction coils and the lower coils 34, 34' of the induction coils is proportional to the square of the number of turns if the cross sectional area of the upper coils 33, 33' of the induction coils and the cross sectional area of the lower coils 34, 34' of the induction coils are the same and is proportional to the number of turns if the cross sectional area of the upper coils 33, 33' of the induction coils and the cross sectional area of the lower coils 34, 34' of the induction coils are proportional to the number of turns. Further, the lateral distance between the upper coils 33, 33' of the induction coils and the field generating coils 1, 1' and the lateral distance between the lower coils 34, 34' of the induction coils and the field generating coils 1, 1' are the same if the cross sectional area of the upper coils 33, 33' of the induction coils and the cross sectional area of the lower coils 34, 34' of the induction coils are the same. If the cross sectional area of the upper coils 33, 33' of the induction coils and the cross sectional area of the lower coils 34, 34' of the induction coils are proportional to the number of turns, then it is the upper coils 33, 33' of the induction coils that have the small cross sectional area of the coil. Therefore, if the gap between the surface of the field generating coil and the surface of the induction coil is kept constant, then the lateral distance between the upper coils 33, 33' of the induction coils and the field generating coils can be made small.

It should be noted that the vertical centers 39, 39' of the induction coils serve as the boundaries between the upper coils 33, 33' of the induction coils and the lower coils 34, 34' of the induction coils.

By adopting this construction for the coils, the position at which the magnetic fields interlinking the induction coils 32, 32' from the field generating coils 1, 1' become zero is that located above the vertical centers 39, 39' of the induction coils, and the position at which the weight of the moving body 6 and the levitation force coincide can be selected as desired based upon the turns ratio of the upper coils 33, 33' of the induction coils to the lower coils 34, 34' of the induction coils. More specifically, by so arranging it that the distances between the uppermost sides $a_2b_2$, $a_2'b_2'$ of the induction coils 22, 22' and the upper sides ij, i'j' of the field generating coils 1, 1' becomes the same as the distances between the lowermost sides $g_2h_2$, $g_2'h_2'$ of the induction coils 32, 32' and the lower sides kl, k'l' of the field generating coils 1, 1' at the position where the weight of the moving body 6 and the levitation force coincide (the vertical centers 8, 8' of the field generating coils and the vertical centers 39, 39' of the induction coils coincide), a large guidance force can be generated. In other words, a large guidance stiffness can be obtained.

In a case where the moving body (truck) 6 is displaced laterally (here a case in which the moving body 6 is displaced in the direction of the induction coil 32 will be taken as an example), an induced current which attempts to restore the moving body to its original position flows between the left and right coils. In the shunting of the induced current between the upper and lower coils, much of the current is shunted into the upper coils 33, 33' of the induction coils in inverse proportion to the impedance of the coils.

The overall coil current is expressed by (shunted current) ×(number of turns). Therefore, in a case where the cross sectional areas of the upper and lower coils are the same, the overall coil current is larger for the upper coils 33, 33' of the induction coils. As a result of this current, the induction coil 32 on the side of narrower lateral spacing 13 between the field generating coil and induction coil produces a downward repulsive force, and the induction coil 32' on the side of wider lateral spacing 13' between the field generating coil and induction coil produces an upward attractive force, thereby producing a clockwise moment in the rolling direction. As a result, this arrangement acts to cancel the above-mentioned counter-clockwise moment in the rolling direction so that the coupling stiffness between guidance and rolling can be reduced.

On the other hand, in a case where the cross sectional areas of the upper and lower coils are proportional to the number of turns, the overall coil current is the same for the upper coils 33, 33' of the induction coils and the lower coils 34, 34' of the induction coils. However, since the lateral spacing between the upper coils 33, 33' of the induction coils and the field generating coils 1, 1' is less than that between the lower coils 34, 34' of the induction coils and the field generating coils 1, 1', the induction coil 32 on the side of narrower lateral spacing 13 between the field generating coil and induction coil produces a downward repulsive force, and the induction coil 32' on the side of wider lateral spacing 13' between the field generating coil and induction coil produces an upward attractive force, thereby producing a clockwise moment in the rolling direction.

As a result, this arrangement acts to cancel the above-mentioned counter-clockwise moment in the rolling direction so that the coupling stiffness between guidance and rolling can be reduced.

A third embodiment of the present invention will now be described.

Figure 7:
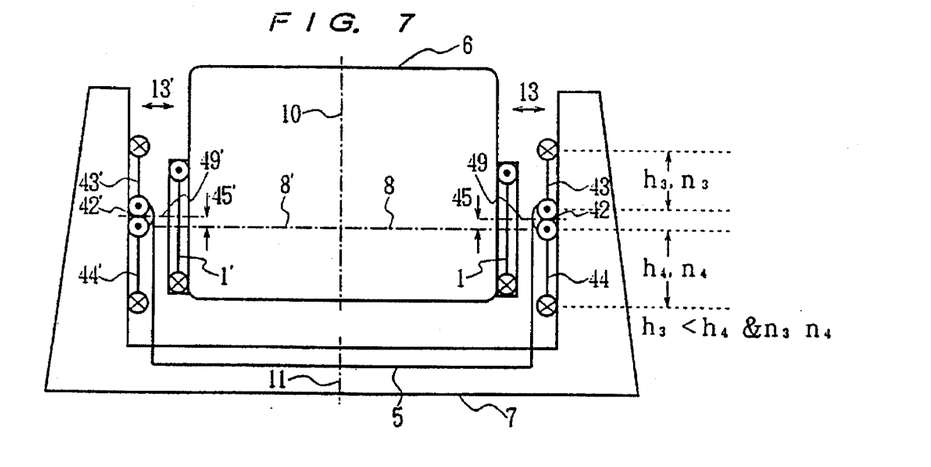
FIG. 7 is an explanatory view illustrative of a third embodiment of the present invention for a case where the height and number of turns of the lower coil segment of an induction coil are greater than the height and number of turns of an upper coil segment of the induction coil composed of upper and lower coils segments in a magnetic levitation apparatus.
Figure 8:
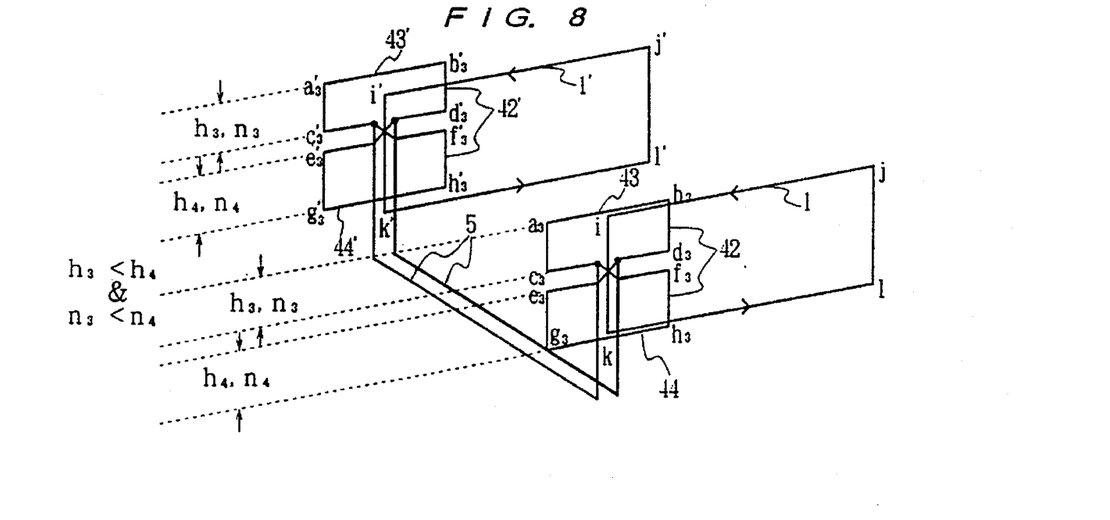
FIG. 8 is an explanatory view illustrating the manner in which field generating coils and induction coils are connected in a magnetic levitation apparatus according to the third embodiment of the present invention.

As shown in FIGS. 7 and 8, in this embodiment the heights and the numbers of turns of the upper and lower stages of the induction coil of the magnetically levitated railway are designed to be different from each other. More specifically, if $h_3$ and $n_3$ represent the height and number of turns, respectively, of the upper stage of the induction coil, and $h_4$ and $n_4$ represent the height and number of turns, respectively, of the lower stage of the induction coil, then the heights are related by $h_3 < h_4$ and the numbers of turns are related by $n_3 < n_4$.

Induction coils 42, 42' are connected in such a manner that upper coils 43, 43' of the induction coils of small height and small number of turns and lower coils 44, 44' of the induction coils of large height and large number of turns become oppositely oriented with respect to the field generating coils 1, 1'. Further, the upper coils 43, 43' of the induction coils and the lower coils 44, 44' of the induction coils are connected, on the left and right sides of the guideway 7, by the null-flux wires 5 so as to be oppositely oriented with respect to the magnetic fields produced by the field generating coils 1, 1'.

The impedance of the upper coils 43, 43' of the induction coils and the lower coils 44, 44' of the induction coils is proportional to coil perimeter and the square of the number of turns if the cross sectional areas of the upper and lower coils are the same and is proportional to the coil perimeter and the number of turns if the cross sectional areas of the upper and lower coils are proportional to the number of turns. Further, the lateral distance between the upper coils 43, 43' of the induction coils and the field generating coils 1, 1' and the lateral distance between the lower coils 44, 44' of the induction coils and the field generating coils 1, 1' are the same if the cross sectional areas of the upper and lower coils are the same. If the cross sectional areas of the upper and lower coils are proportional to the number of turns, then it is the upper coils 43, 43' of the induction coils that have the small cross sectional area of the coil. Therefore, if the gap between the surface of the field generating coil and the surface of the induction coil is kept constant, then the lateral distance between the upper coils 43, 43' of the induction coils and the field generating coils can be made small.

It should be noted that the vertical centers 49, 49' of the induction coils serve as the boundaries between the upper coils 43, 43' of the induction coils and the lower coils 44, 44' of the induction coils.

By adopting this construction for the coils, the position at which the magnetic fields interlinking the induction coils 42, 42' from the field generating coils 1, 1' become zero is that located above the vertical centers 49, 49' of the induction coils, and the position at which the weight of the moving body 6 and the levitation force coincide can be selected as desired based upon the turns ratio of the upper coils 43, 43' of the induction coils to the lower coils 44, 44' of the induction coils. More specifically, by so arranging it that the distances between the uppermost sides $a_3b_3$, $a_3'b_3'$ of the induction coils 42, 42' and the upper sides ij, i'j' of the field generating coils 1, 1' becomes the same as the distances between the lowermost sides $g_3h_3$, $g_3'h_3'$ of the induction coils 42, 42' and the lower sides kl, k'l' of the field generating coils 1, 1' at the position where the weight of the moving body 6 and the levitation force coincide, a large guidance force can be generated. In other words, a large guidance stiffness can be obtained.

In a case where the moving body (truck) 6 is displaced laterally (here a case in which the moving body 6 is displaced in the direction of the induction coil 42 will be taken as an example), an induced current which attempts to restore the moving body to its original position flows between the left and right coils. In the shunting of the induced current between the upper and lower coils, much of the current is shunted into the upper coils 43, 43' of the induction coils in inverse proportion to the impedance of the coils.

The overall coil current is expressed by (shunted current) ×(number of turns). Therefore, in a case where the cross sectional areas of the upper and lower coils are the same, the overall coil current is larger for the upper coils 43, 43' of the induction coils. As a result of this current, the induction coil 42 on the side of narrower lateral spacing 13 between the field generating coil and the induction coil produces a downward repulsive force, and the induction coil 42' on the side of wider lateral spacing 13' between the field generating coil and the induction coil produces an upward attractive force, thereby producing a clockwise moment in the rolling direction. As a result, this arrangement acts to cancel the above-mentioned counter-clockwise moment in the rolling direction so that the coupling stiffness between guidance and rolling can be reduced.

On the other hand, in a case where the cross sectional areas of the upper and lower coils are proportional to the number of turns, the overall coil current is larger for the upper coils 43, 43' of the induction coils and the lateral spacing 13 between the field generating coils and the induction coils is less than that for the lower coils 44, 44' of the induction coils. Therefore, the induction coil 42 on the side of narrower lateral spacing 13 between the field generating coil and induction coil produces a downward repulsive force, and the induction coil 42' on the side of wider lateral spacing 13' produces and upward attractive force, thereby producing a clockwise moment in the rolling direction. As a result, this arrangement acts to cancel the above-mentioned counter-clockwise moment in the rolling direction so that the coupling stiffness between guidance and rolling can be reduced.

Figure 9:
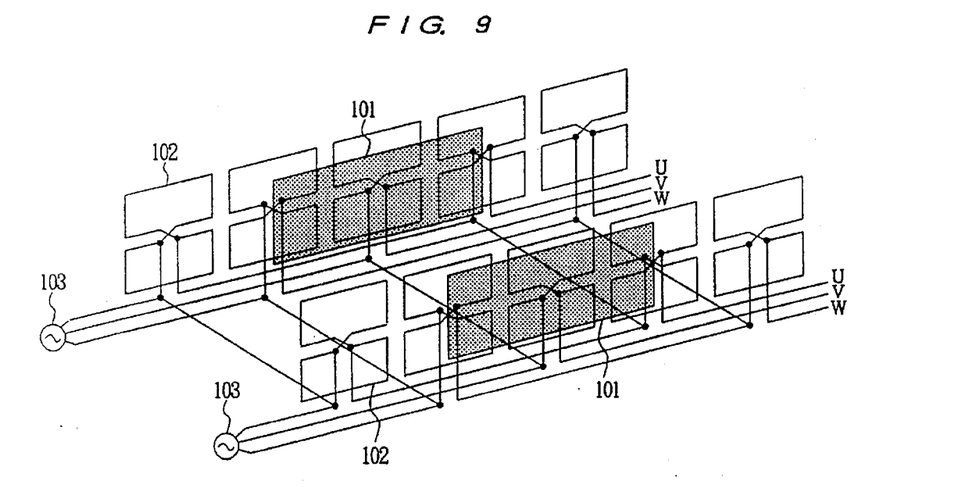
FIG. 9 is a diagram showing a first application of a vertically asymmetrical figure-eight coil of a magnetic levitation apparatus according to the present invention.
Figure 10:
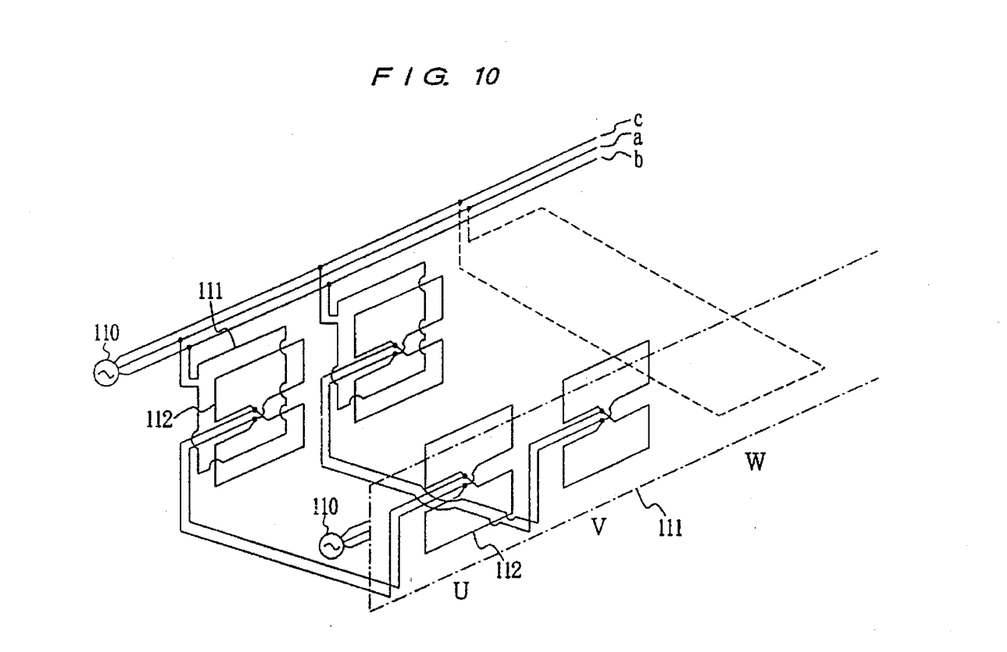
FIG. 10 is a diagram showing a second application of a vertically asymmetrical figure-eight coil of a magnetic levitation apparatus according to the present invention.

In case of a magnetically levitated railway, an arrangement can be adopted in which the vertically asymmetrical figure-eight coil of the above-described magnetic levitation apparatus is used in a levitation-guidance-propulsion system wherein, as shown in FIG. 9, a vertically asymmetrical figure-eight coil 102 serving as a ground coil facing a superconducting magnet 101 is used conjointly as a propulsion device, in addition to levitation and guidance devices, connected also to a propulsion power supply 103. As shown in FIG. 10, an arrangement may be adopted in which a vertically asymmetrical figure-eight coil 112 is used as the means of levitation and guidance in levitation and guidance devices independently of a propulsion device 111 connected to a propulsion power supply 110. In FIG. 10, the internal arrangement of the propulsion device 111 on the nearest side thereof is not shown.

In accordance with the embodiments described above, the guidance stiffness can be enlarged, the coupling stiffness between guidance and rolling can be reduced and the equivalent guidance stiffness can be increased. As a result, it is possible to support a moving body without contact in a region of low velocities. According to the present invention, contactless support of a moving body is possible at velocity of less than 100 km/h.

Further, in a case where the invention is applied to a conveyance system, the same effects can be obtained merely by changing the moving body from the truck to a conveyed body.

It will be apparent from the foregoing description that the vertically asymmetrical figure-eight coil of the magnetic levitation apparatus according to the present invention exhibits the following advantages:

(1) Since the equivalent guidance stiffness is increased, non-contact support of a moving body is possible in a region of lower velocities.

(2) As a result of (1) above, traveling by means of auxiliary wheels is reduced. This facilitates maintenance of the auxiliary wheels and prolongs the service life thereof.

(3) As a result of (1) above, traveling by means of auxiliary wheels is reduced. This is economically advantageous in that less management is required for railway maintenance.

(4) As a result of (1) above, traveling by means of auxiliary wheels is reduced. Accordingly, there is less noise and vibration that accompany contact and it is possible to reduce environmentally detrimental effects.

As many apparently widely different embodiments of the present invention can be made without departing from the spirit and scope thereof, it is to be understood that the invention is not limited to the specific embodiments thereof except as defined in the appended claims.

What is claimed is:

1. Coils of a magnetic levitation apparatus for supporting a moving body without contact by utilizing electromagnetic force produced by electromagnetic induction, comprising left and right coils on left and right sides of a guideway, each coil including upper and lower stages of a two-stage induction coil arranged vertically with respect to direction of travel of the moving body and connected in an asymmetrical figure-eight structure having mutually opposing orientations, said left and right coils also being interconnected so as to be oppositely oriented with respect to magnetic fields produced by field generating coils so as to produce a guidance force large enough to offset lateral displacement of the moving body, said asymmetrical figure-eight structure being such as to reduce generation of a moment in direction of rolling of the moving body and to make possible non-contact support of the moving body in a region of lower velocities.

2. The coils according to claim 1, wherein the upper and lower stages of the asymmetrical figure-eight structure of the induction coil have different heights from each other.

3. The coils according to claim 2, wherein the height of the upper stage of the asymmetrical figure-eight structure of the induction coil is less than the height of the lower stage of the asymmetrical figure-eight structure of the induction coil.

4. The coils according to claim 1, wherein the upper and lower stages of the asymmetrical figure-eight structure of the induction coil have different numbers of turns from each other.

5. The coils according to claim 4, wherein the number of turns of the upper stage of the induction coil is less than the number of turns of the lower stage of the induction coil.

6. The coils according to claim 1, wherein the upper and lower stages of the asymmetrical figure-eight structure of the induction coil have different heights and different numbers of turns from each other.

7. The coils according to claim 6, wherein the height and the number of turns of the upper stage of the asymmetrical figure-eight structure of the induction coil is less than the height and the number of turns of the lower stage of the asymmetrical figure-eight structure of the induction coil.

8. Coils of a magnetic levitation apparatus according to claim 1 used as a ground coil of a magnetically levitated railway system arranged on a guideway.

9. Coils of a magnetic levitation apparatus according to claim 1 used as a fixed coil of a magnetically levitated conveyance system arranged on a conveyance line.

* * * * *